United States Patent [19]
Ford et al.

[11] Patent Number: 5,784,857
[45] Date of Patent: Jul. 28, 1998

[54] SELF- LOCATING STAR WHEEL SYSTEM FOR A PACKAGING MACHINE

[75] Inventors: Colin P. Ford, Woodstock, Ga.; Carl J. Taute, Merrifield, Minn.

[73] Assignee: Riverwood International Corporation, Atlanta, Ga.

[21] Appl. No.: 855,399

[22] Filed: May 13, 1997

Related U.S. Application Data

[60] Provisional application No. 60/018,885 May 31, 1996.

[51] Int. Cl.⁶ .................................................. B65B 35/30
[52] U.S. Cl. .............................. 53/201; 53/52; 198/473.1
[58] Field of Search ............................ 493/18; 198/395, 198/473.1, 480.1; 53/52, 54, 56, 201, 493, 542, 543

[56] References Cited

U.S. PATENT DOCUMENTS

| | | |
|---|---|---|
| 2,987,163 | 6/1961 | Eddison et al. |
| 3,599,780 | 8/1971 | Sorbie |
| 4,875,323 | 10/1989 | Craighead ............ 53/56 X |
| 5,046,599 | 9/1991 | Hamano |
| 5,056,650 | 10/1991 | Kronseder |
| 5,082,105 | 1/1992 | Tincati |
| 5,123,518 | 6/1992 | Pfaff |
| 5,482,427 | 1/1996 | Olson ............ 53/543 X |
| 5,502,950 | 4/1996 | Moncrief et al. ........ 53/543 X |
| 5,540,320 | 7/1996 | Sarto et al. |
| 5,669,200 | 9/1997 | Disrud ............ 53/201 |
| 5,671,585 | 9/1997 | Peronek et al. ........ 53/201 X |
| 5,699,651 | 12/1997 | Miller et al. ........... 53/543 X |

*Primary Examiner*—Daniel Moon
*Attorney, Agent, or Firm*—Skinner and Associates; Joel Skinner; Steve McLary

[57] ABSTRACT

A self-locating star wheel system for spacing bottles on a conveyor in a packaging machine comprising a pair of star wheels with a hub and cam disposed between them and mounted on an arm which moves them into the stream of bottles until the cam engages a pair of rollers mounted at the ends of a U-shaped pivoting bracket attached to the machine frame to control the lateral position of the star wheels with respect to the stream of bottles. The cam diameter is specific for a given size star wheel so that the proper positioning of the star wheel is achieved by the geometric relationship between the star wheel and the cam. The mechanism also functions as a safety feature by sending a stop signal to the machine when something, such as a down bottle, causes the star wheels move away from the rollers. The U-shaped pivoting bracket is spring loaded so that as the cam moves away from the rollers, the bracket pivots causing a metal block attached to the bracket to swing into position to activate a proximity sensor which sends the stop signal.

23 Claims, 6 Drawing Sheets

SELF-LOCATING STAR WHEEL SYSTEM FOR A PACKAGING MACHINE

CROSS-REFERENCE TO RELATED APPLICATIONS

This application claims the benefit, under 35 U.S.C. 119(e), of provisional application Ser. No. 60/018,885, filed May 31, 1996.

STATEMENT REGARDING FEDERALLY SPONSORED RESEARCH OR DEVELOPMENT

Not applicable.

REFERENCE TO A MICROFICHE APPENDIX

Not Applicable.

BACKGROUND OF THE INVENTION

1. Field of the Invention.

The present invention relates, generally, to packaging machines. More particularly, the invention relates to an article positioning star wheel for packaging machines.

2. Background Information.

In a typical packaging machine for placing groups of articles, such as bottles or cans, within individual cartons, the cartons are in a collapsed form, called a blank, at one end of the packaging machine. Articles to be packaged are fed in mass by a conveyor into tracks at the in-feed end of the machine. The machine opens a carton blank, groups and positions articles to be placed in the carton, brings the group of articles and carton together, then closes and seals the carton, and dispenses it out the other end of the machine. At the in-feed end, articles in the tracks are touching each other, and often pressed tightly together from the pressure exerted by the in-feed conveyor. The articles need to be properly spaced for subsequent packaging.

On packaging machines which process bottles, one device which relieves in-feed line pressure and properly positions or spaces bottles is called a star wheel. A star wheel has a general configuration much like a sprocket for a chain. Just as the outside of a sprocket has circular pockets which receive the pins of a chain as the chain passes over it, the outside of a star wheel has uniformly spaced equal-size circular pockets which receive bottles as the stream of bottles passes over it. Often a pair of star wheels are used, one wheel near the top of the bottles and one near the bottom. The two star wheels are axially aligned on and fixedly attached to a hub so that the hub and two star wheels function as a unit. As with a sprocket, a star wheel has teeth between the pockets. As the star wheels rotate, the teeth of the star wheels separate the bottles coming to them causing each bottle to be temporarily captured in a pocket, and subsequently discharged onto the conveyor. This relieves the upstream line pressure created on the bottles by the in-feed conveyor. The speed of rotation of the star wheels with respect to the conveyor speed dictates spacing of the bottles leaving the star wheels. Each lane of a bottle packaging machine has its own star wheel or pair of star wheels.

It is important that star wheels be properly positioned with respect to the stream of bottles so that (1) the teeth penetrate the stream of bottles at the proper depth to properly separate the incoming bottles; (2) the space between the wall of a pocket and the back wall of the track is proper so that it does not squeeze bottles to tightly as they pass through nor let them be too loose; and (3) the rotation of the star wheels detain the bottles the proper time to relieve upstream line pressure and create any downstream spacing of bottles.

The curvature of the pockets in a star wheel is specific for a particular size range bottle. For example, one size pocket will be used for bottles ranging from 3 to 4 inches in diameter, another for 2.5 to 3 inch diameter bottles, and a third for 2 to 2.5 inch diameter bottles. Star wheels with different pocket sizes may have different outer diameters, and the number of pockets may be different for each one. When bottles in a different size range are to be run, the star wheels must be changed and repositioned.

In the past, the position of the star wheels has been manually adjustable by a series of screws and shafts or screws and slots. The machine operator adjusted the star wheel position at the beginning of a run. If, during a run, something were to happen that required the star wheels to be moved out of position, such as a bottle falling down and jamming in the star wheels, the position had to be manually reset again. Manual adjustment can be a time consuming operation and its effectiveness is dependent on the skill of the person making the adjustment.

In the past, a particular packaging machine could be dedicated to one size bottle. However, since packaging machines have become more sophisticated and consequently more expensive, there is a need for one machine to have the capability of processing the entire range of bottle sizes. Changing the machine to accommodate the different bottle sizes should be simple, fast, and accurate. Such a machine requires relatively frequent changing and repositioning of the star wheels. The prior art manual method of adjusting the position of star wheels is undesirable on such a machine.

Despite the need in the art for a star wheel system which overcomes the disadvantages, shortcomings and limitations of the prior art, none insofar as is known has been developed. Accordingly, it is an object of the present invention to provide an improved star wheel system which automatically positions the star wheels to the proper location thereby eliminating the need for manual adjustment.

It is a further object of this invention to provide a star wheel system which makes changing and repositioning star wheels a simple, fast, and accurate operation.

It is a further object of this invention to provide a star wheel system which also provides a redundant down-bottle detector.

BRIEF SUMMARY OF THE INVENTION

The apparatus of the present invention provides a star wheel for relieving in-feed line pressure and spacing bottles on a conveyor in a packaging machine wherein the star wheel is automatically positioned properly with respect to the stream of bottles. The star wheel has a series of uniformly spaced equal-size circular pockets, separated by teeth, which receive bottles as the stream of bottles passes across it. At least one star wheel and a cam are attached to a hub. The star wheel, cam and hub assembly is mounted on a mechanism which moves the assembly into and out of the stream of bottles. When the assembly is moved into the stream of bottles, the motion stops when the cam meets a pair of cam followers attached to the ends of a pivoting U-shaped bracket mounted on a member of the machine. The diameter of the cam is specific for a particular star wheel and so that when the cam is snugly positioned against the cam followers, the teeth of the star wheel penetrate the proper depth into the stream of bottles to properly capture the bottles. This eliminates the need for manual adjustment of the star wheel position each time the star wheel is moved out of and back into position, such as to clear a down bottle or to change to a different star wheel for a different run. The proper positioning of the star wheel is achieved by the geometric relationship between the star wheel and the cam outer diameter. The star wheel of the present invention may be positioned by activating a mechanism, such as an air cylinder, which moves the star wheel assembly into the stream of bottles until the cam stops against the cam followers.

The apparatus of the present invention also provides a secondary down bottle indicator. Because the star wheel assembly is not rigidly held in position, the star wheel assembly can be displaced from its proper position by a down bottle. A device such as an air cylinder can provide a known and adjustable force to hold the cam of the star wheel assembly snugly against the cam followers. A down bottle can provide enough counter force to move the star wheel assembly away from the cam followers. In the preferred embodiment, the bracket holding the cam followers is pivotably mounted and spring loaded so that as the cam moves away from the cam followers, the bracket pivots and moves a block of metal attached to it into position to activate a sensor, such as a proximity sensor, which can stop the machine.

The features, benefits and objects of this invention will become clear to those skilled in the art by reference to the following description, claims and drawings.

DETAILED DESCRIPTION

Figure 1:
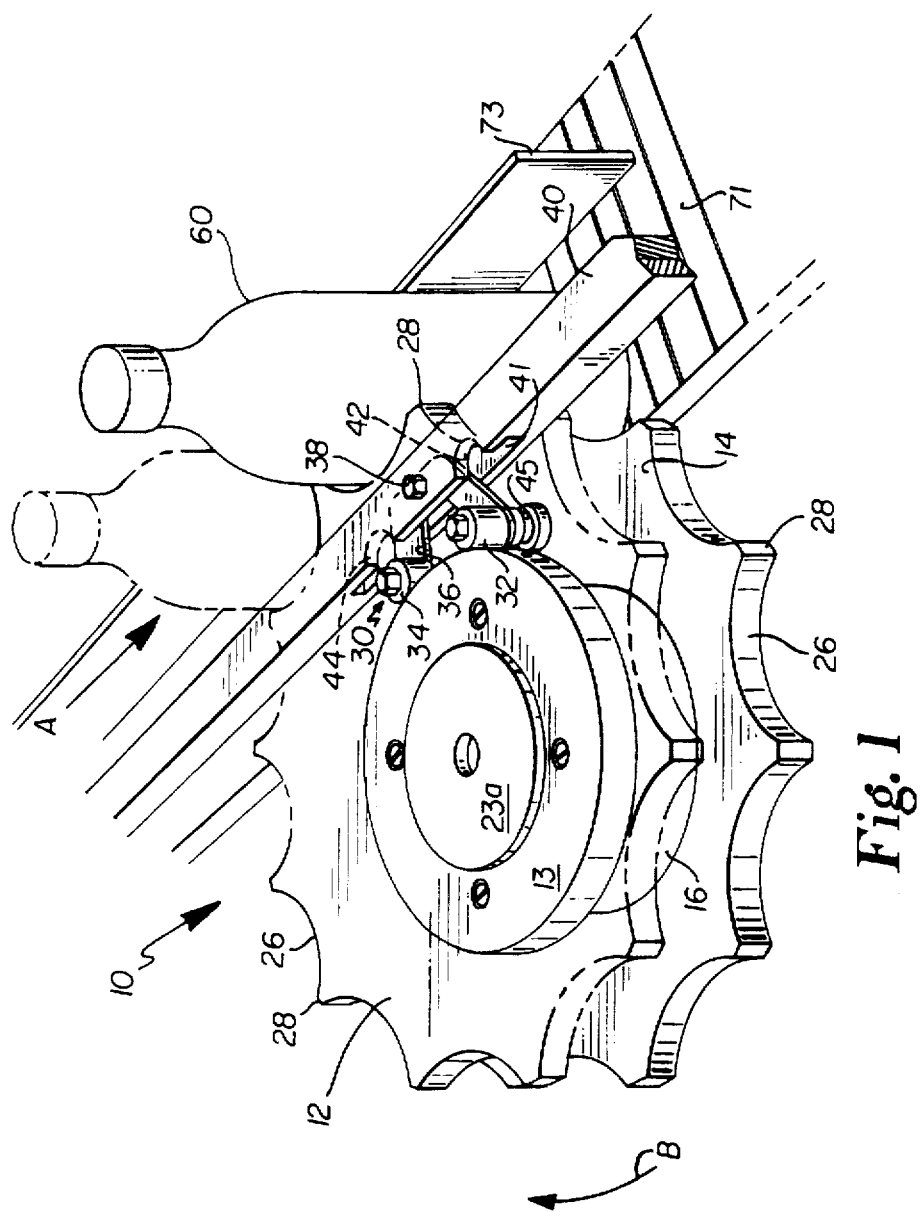
FIG. 1 is a perspective view of a star wheel assembly and cam follower assembly.
Figure 2:
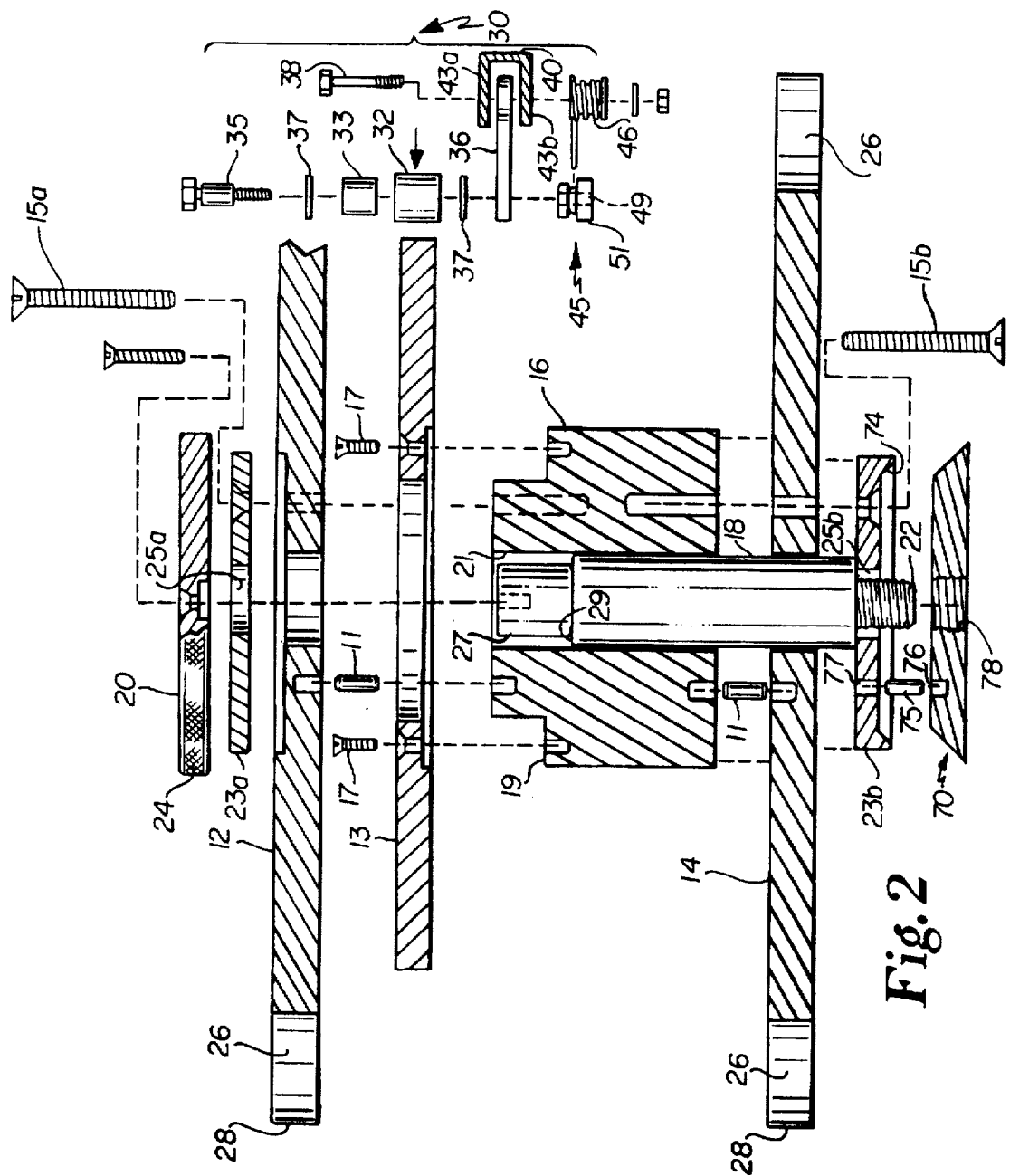
FIG. 2 is an exploded view partially in cross section of the star wheel assembly and cam follower assembly of FIG. 1.

Referring to FIGS. 1 and 2 the present invention comprises a star wheel assembly 10 and a cam follower assembly 30. In the preferred embodiment, the star wheel assembly 10 comprises an upper star wheel 12 and a lower star wheel 14 attached to and separated by a hub 16. Cam 13 is attached to hub 16 and located between star wheel 12 and star wheel 14. In the preferred embodiment cam 13 is circular and hub 16 has shoulder 19 with screws 17 securing cam 13 to shoulder 19. A shaft 18 is received in axial bore 21 of hub 16. One end of shaft 18 has nut 20 attached, and the other end has threads 22 which engage threads 78 in base plate 70 to hold star wheel assembly 10 firmly on base plate 70. Base plate 70 is rotated by a drive mechanism (79 in FIG. 4) and the rotational speed of base plate 70 is synchronized with the speed conveyor 71.

Partially recessed into star wheels 12 and 14 are washer plates 23a and 23b which have axial apertures 25a and 25b respectively. Washer plate 23b has at least one feature for aligning washer plate 23b with base plate 70. In the preferred embodiment, radial alignment is achieved by the engagement of tapered surface 72 on base plate 70 with tapered surface 74 on washer plate 23b and clocking is achieved by dowel pin 75 engaging hole 76 in base plate 70 and hole 77 in washer plate 23b. Apertures 25a and 25b are smaller than bore 21 in hub 16. Screws 15a and 15b extend through star wheels 12 and 14 respectively and secure star wheels 12 and 14 and washer plates 23a and 23b to hub 16.

Shaft 18 has a reduced diameter portion 27, which is small enough to pass freely through aperture 25a in washer plate 23a, and a shoulder 29 which has a large enough diameter to stop against washer plate 23a when shaft 18 with nut 20 is lifted through washer plate 23a. Shaft 18 with nut 20 attached is thereby captured in bore 21 of hub 16. In this way the entire star wheel assembly 10 can be removed as a unit with shaft 18 and nut 20 as shaft 18 with nut 20 is removed from base plate 70. In the preferred embodiment, nut 20 has circumferential surface 24 knurled and has a diameter appropriate to facilitate easy rotation by hand so that star wheel assemblies 10 can rapidly and easily be changed without the use of tools.

Star wheels 12 and 14 resemble a sprocket in that they have a series of pockets 26 and teeth 28 uniformly spaced around the circumference of each star wheel. Star wheels 12 and 14 are positioned on hub 16 using dowel pins 11 so that pockets 26 and teeth 28 of both star wheels 12 and 14 align axially.

When articles such as bottles 60 are processed, star wheel assembly 10 is positioned as shown in FIG. 1 so that bottles are sandwiched between lane wall 73 and star wheels 12 and 14. Teeth 28 slightly penetrate between bottles 60 and each bottle is temporarily captured in a pocket 26 as the stream of bottles moves in the direction indicated by arrow A and the star wheel assembly 10 rotates in the direction indicated by arrow B.

The configuration of an upper and lower star wheel separated by a hub is particularly well suited for packaging plastic bottles because the star wheels engage bottles at two places along the body of the bottle. Such engagement provides more stable movement of bottles than a single star wheel which engages bottles at one place. However, the present invention would also work with a single star wheel mounted on a hub.

Figure 6:
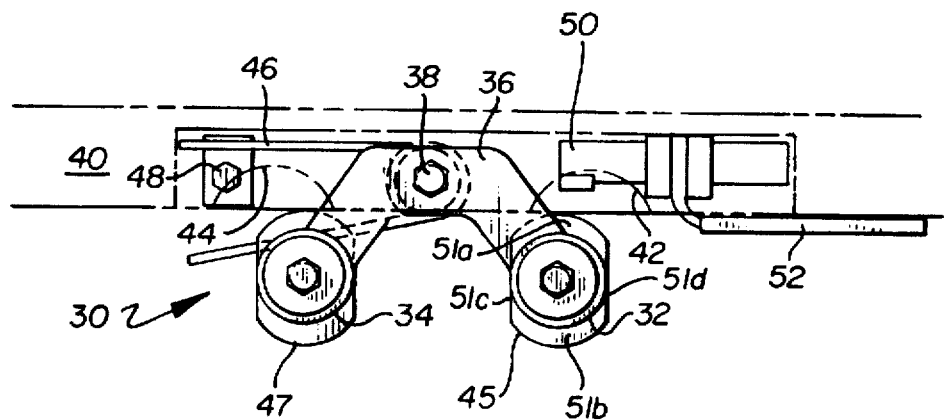
FIG. 6 is a detailed top view of the cam follower assembly shown in FIG. 3.

Referring to FIGS. 1, 2, and 6, cam follower assembly 30 comprises a pair of cam followers 32 and 34 mounted at the ends of and on top of a bracket 36 which is generally U-shaped. In the preferred embodiment, cam followers 32 and 34 are rollers running on needle bearings 33 which are pressed into cam followers 32 and 34 and secured to bracket 36 with bolts 35 and washers 37. Bracket 36 pivots in the plane of the bracket about a bolt 38 through cam pivot mount member 40. A slot in cam pivot mount member 40 receives bracket 36. The slot divides cam pivot member 40 into an upper portion 41 and a lower portion 43 in the vicinity of bracket 36. Recesses 42 and 44 in upper portion 41 provide clearance for cam followers 32 and 34 as bracket 36 pivots. Stop blocks 45 and 47 are mounted on the bottom of bracket 36 and in line with cam followers 32 and 34. Internal threads 49 in stop blocks 45 and 47 cooperate with threads of bolts 35 to secure the stop blocks 45 and 47, cam followers 32 and 34, and bracket 36 together. Spring 46 acts between stop 48 mounted on cam pivot mount member 40 and stop block 47 to pivot bracket 36 in the direction which brings the lower portion 51 of stop block 45 into contact with lower portion 43 of cam pivot mount member 40. Sensor 50, which in the preferred embodiment is a proximity sensor, detects the presence of the lower portion 51 of stop block 45 at the lower portion 43 of cam pivot mount member 40 and sends a signal to the packaging machine controller that stops the machine. Sensor 50 is attached to bracket 52 which is affixed to cam pivot mount member 40.

Figure 3:
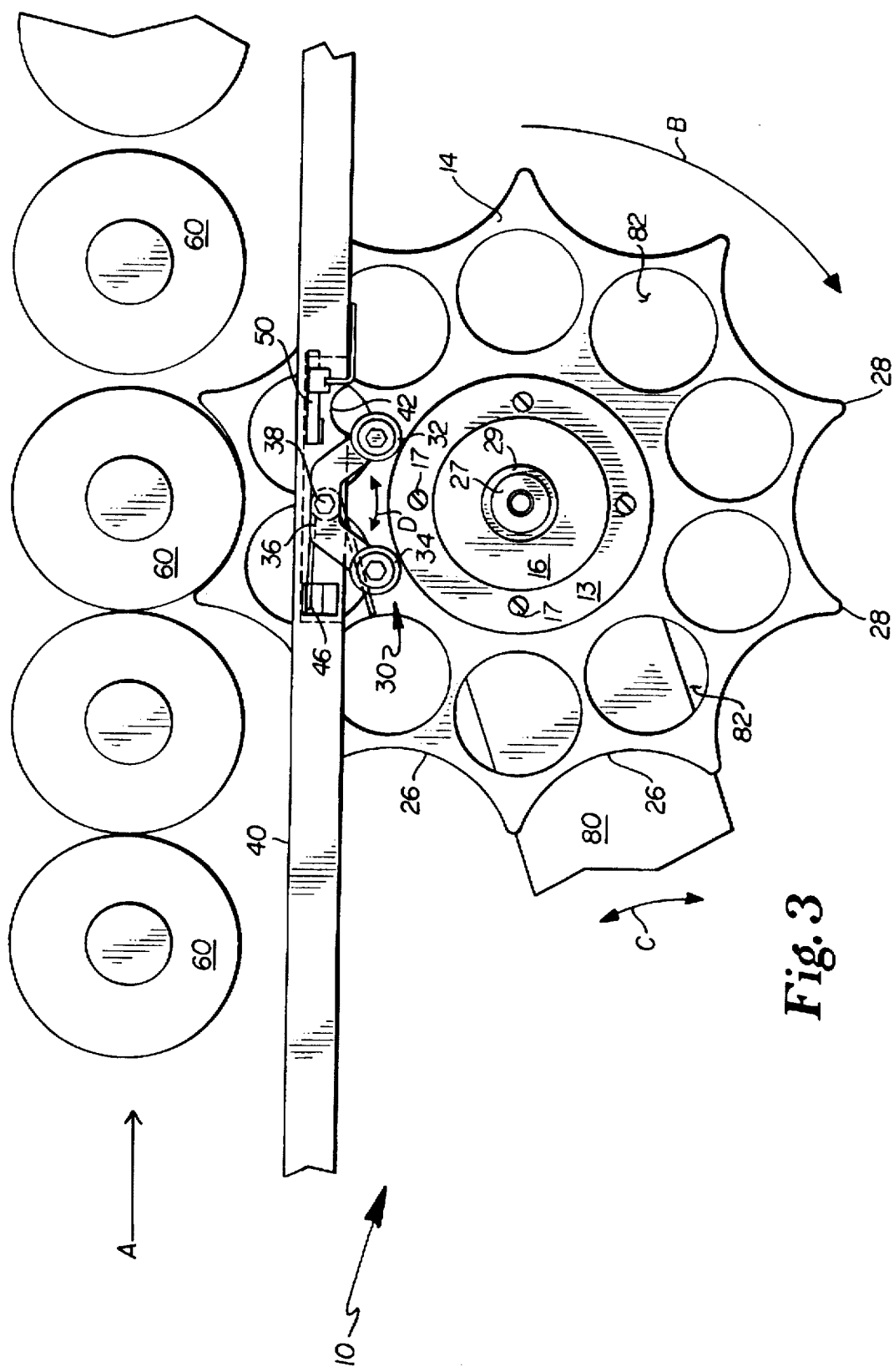
FIG. 3 is a top view of the assembly of FIG. 1.

FIG. 3 shows star wheel assembly 10 without upper star wheel 12, washer plate 23a or nut 20 to see the interaction between cam follower assembly 30 and star wheel assembly 10. Pockets 26 are sectors of circles sized to accommodate a range of bottle diameters. Star wheels have different diameters with different size pockets depending on the bottle size to be processed. A star wheel with larger pockets for larger diameter bottles A will have fewer pockets around its circumference than one with smaller pockets for smaller diameter bottles. In the preferred embodiment, three sizes of star wheels can accommodate bottle diameters ranging from 2 to 4 inches. A ten-pocket star wheel, as illustrated in FIG. 3, handles bottle diameters from 3 to 4 inches; a 16-pocket one from 2.5 to 3 inches; and a 20 pocket one from 2 to 2.5 inches. The pockets 26 on any particular star wheel are all the same size. When bottles outside the size range for a particular star wheel are to be run, the star wheel assembly 10 must be changed. Star wheels 12 and 14 may have lightening holes 82 which reduce weight and inertia of star wheel assembly 10 making it easier to manually remove and change star wheel assemblies.

Star wheel assembly 10 is mounted on a movable arm 80 which swings star wheel assembly 10 into and out of position in the direction indicated by arrow C, which causes spring-loaded bracket 36 to pivot in the direction indicated by arrow D. When star wheel assembly 10 is in its running position, cam 13 engages cam followers 32 and 34, and sensor 50 does not detect the lower portion 51 of stop block 45 (shown in FIGS. 2 and 6). The outer diameter of cam 13 is coordinated with the outer diameter of star wheels 12 and 14 so that the teeth 28 of star wheels 12 and 14 penetrate the stream of bottles 60 to the proper depth when cam 13 is snugly engaged against cam followers 32 and 34. This is true for all sizes of star wheels used. To properly position star wheel assembly 10 with respect to a stream of bottles 60, a force, such as that from an air cylinder, is applied to movable arm 80 causing movable arm 80 to swing star wheel assembly toward bottles 60 until cam 13 engages cam followers 32 and 34. The force which moved movable arm 80 into position also keeps cam 13 snugly positioned against cam followers 32 and 34 during normal operation. This eliminates the need for manual adjustment of the star wheel position each time the star wheel is moved out of and back into position, such as to clear a down bottle or to change to a different size star wheel for a different run. The proper positioning of the star wheel is achieved by the geometric relationship between the star wheel and the cam outer diameter. Positioning a star wheel of the present invention is as simple as activating an air cylinder which moves the star wheel assembly into the stream of bottles until the cam stops against the cam followers. Removing and changing a star wheel assembly 10 is as simple as moving star wheel assembly 10 away from cam follower assembly 30, loosening nut 20 by hand, pulling nut 20 and shaft 18 up to engage upper washer plate 23a and remove star wheel assembly 10, placing another star wheel assembly 10 on base plate 70 so that dowel pin 75 engages hole 77 in lower washer plate 23b, tightening nut 20 by hand, and moving star wheel assembly 10 to snugly engage cam follower assembly 30.

Referring to FIGS. 1 and 3, in operation, a stream of bottles 60 move on a conveyor 71 in the direction indicated by arrow A into the star wheel station. Star wheel assembly 10 rotates in the direction indicated by arrow B. As the star wheel assembly 10 rotates, teeth 28 separate the bottles 60, causing each bottle to be temporarily captured in a pocket 26, and subsequently discharged onto the conveyor. This relieves line pressure from incoming bottles and may space the bottles 60 on the conveyor for subsequent processing. The rotational speed of the star wheel assembly 10 with respect to the conveyor 71 speed determines the spacing of the bottles leaving the star wheel station.

Figure 4:
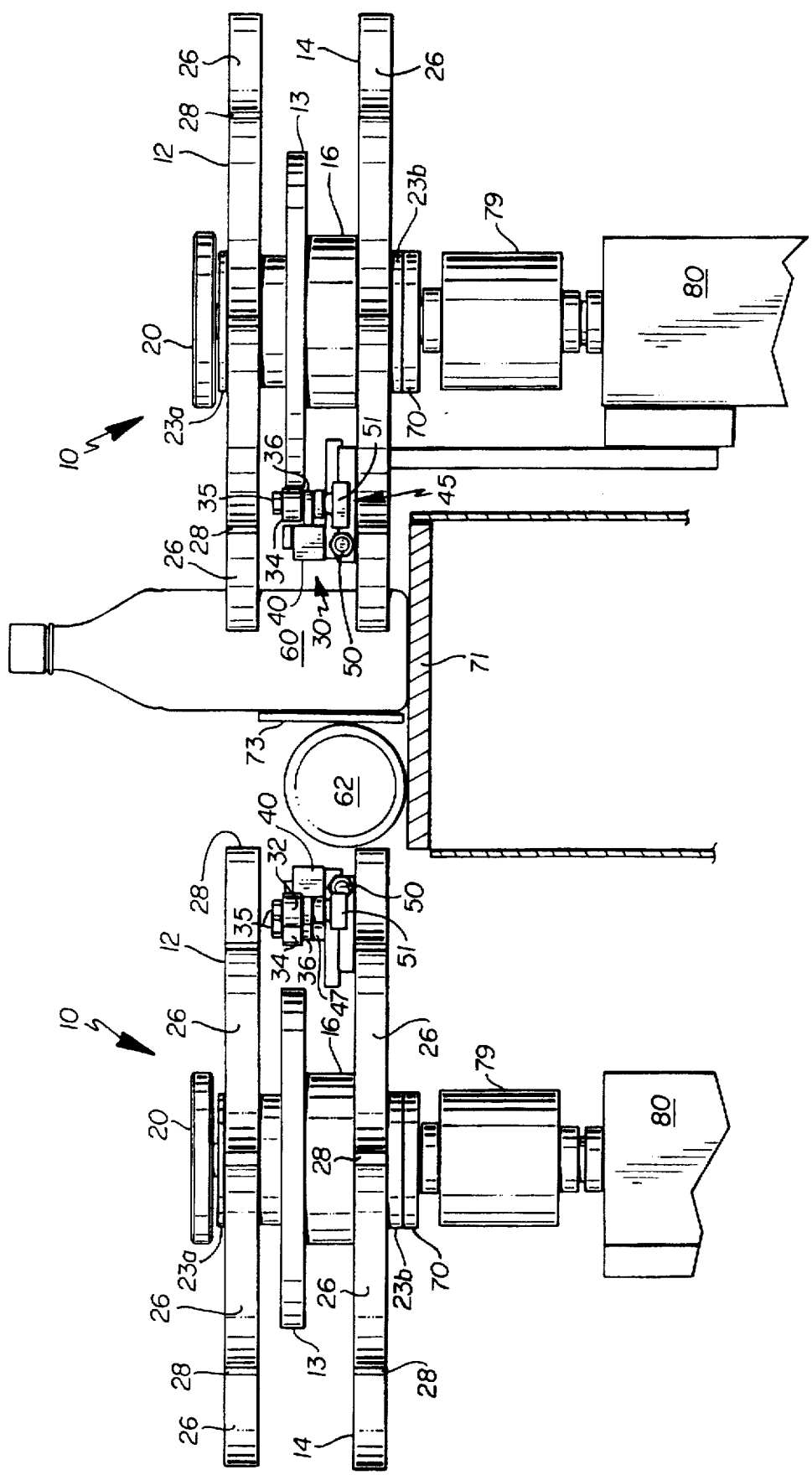
FIG. 4 is an end view of two star wheel and cam follower assemblies operating on a two rows of bottles. The right assembly is shown in normal operation. The left assembly is shown encountering a down bottle.

Referring to FIG. 4, an end view of two star wheel assemblies of the present invention are shown as used on two rows of bottles. The star wheel assembly on the right is shown in normal running position. The assembly on the left is shown as positioned when a down bottle moves star wheel assembly 10 away from cam follower assembly 30 thereby causing the packaging machine to stop. The apparatus of the present invention provides a redundant or secondary down bottle indicator. Rather than being rigidly held in position, the star wheel assembly 10 is held in position against the cam followers by a known and adjustable force such as that supplied by an air cylinder. A down bottle 62 can provide enough counter force to move the star wheel assembly 10 away from the cam followers 32 and 34, thereby causing bracket 36 to pivot and allow lower portion 51 of stop block 45 to activate sensor 50 which stops the machine.

Figure 5:
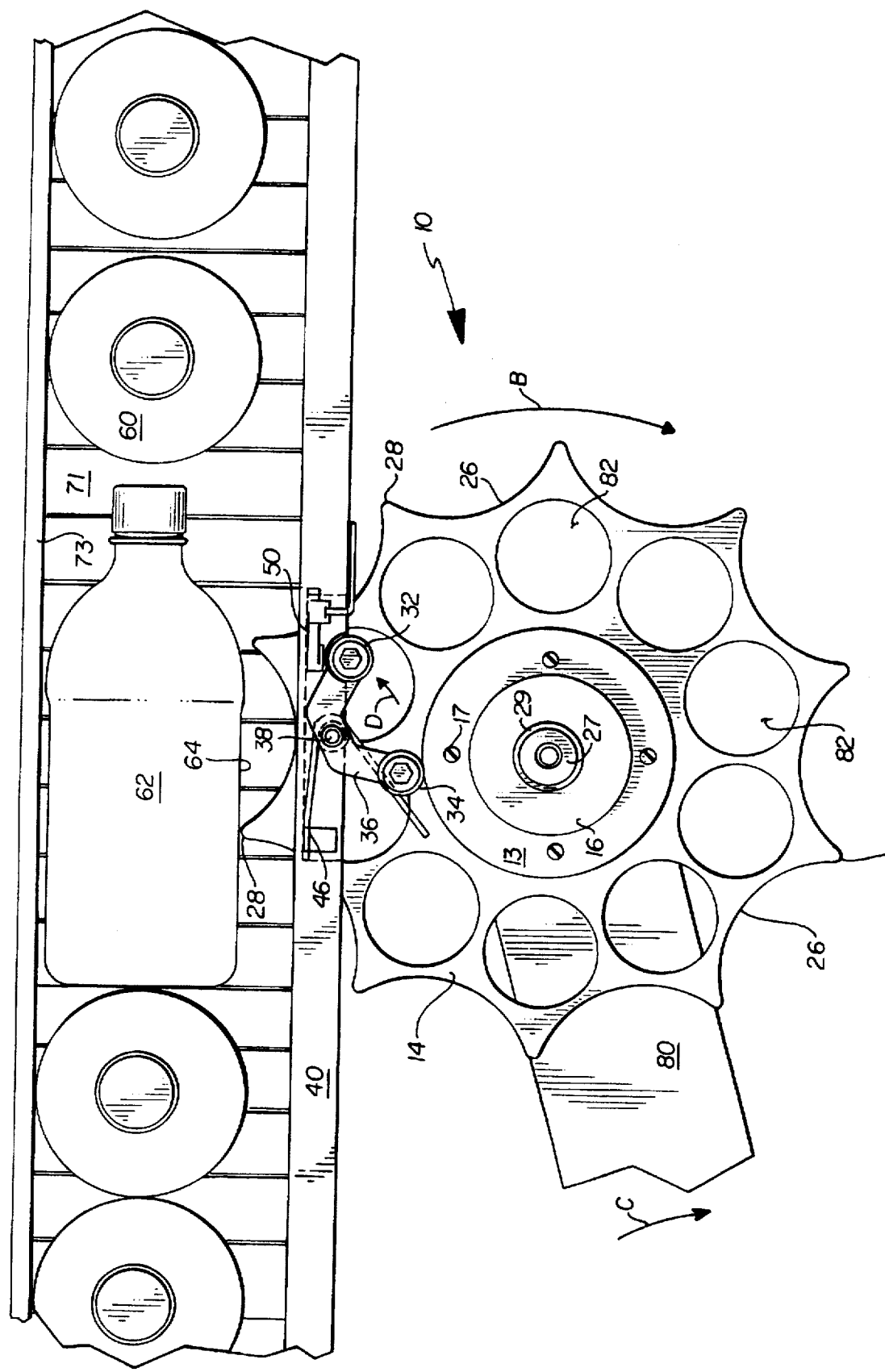
FIG. 5 is a top view of the left assembly of FIG. 4 showing the interaction of the star wheel assembly and the cam follower assembly when a down bottle is encountered.

Referring to FIG. 5, a top view of a star wheel assembly 10 shows how a down bottle 62 moves star wheel assembly 10 to stop the packaging machine. The teeth 28 of the lower star wheel 14 will contact side 64 of down bottle 62 which then causes arm 80 to move in the direction indicated by arrow C. The force holding cam 13 against cam followers 32 and 34 must not be so high that teeth 28 would rupture bottle 62 before star wheel assembly 10 is moved out of position by down bottle 62. As cam 13 moves away from cam followers 32 and 34, bracket 36 pivots in the direction indicated by arrow D which brings lower portion 51 of stop block 45 into position to activate sensor 50 to stop the packaging machine.

Referring to FIG. 6, a more detailed top view of cam follower assembly 30 shows spring 46 acting between stop 48 mounted on cam pivot mount member 40 and stop block 47 to pivot bracket 36. In the preferred embodiment, lower portion 51 of stop blocks 45 and 47 have two opposing lobes 51a and 51b and two opposing flats 51c and 51d. Lobe 51a is the section of lower portion 51 of stop block 45 which activates sensor 50. Flats 51c and 51d allow a wrench to be applied to stop blocks 45 and 47 when bolts 38 are tightened. Stop block 45 and 47 and sensor 50 are positioned such that lower portion 51 will activate sensor 50 when bracket 36 pivots to bring stop block 45 in contact with lower portion 43b (see FIG. 2) of cam mount member 40. Sensor 50 is installed in bracket 52 which is attached to cam pivot mount member 40. In the preferred embodiment sensor 50 is a non-contact sensor, such as a proximity sensor, but a contact type sensor or switch would also work.

Figure 7:
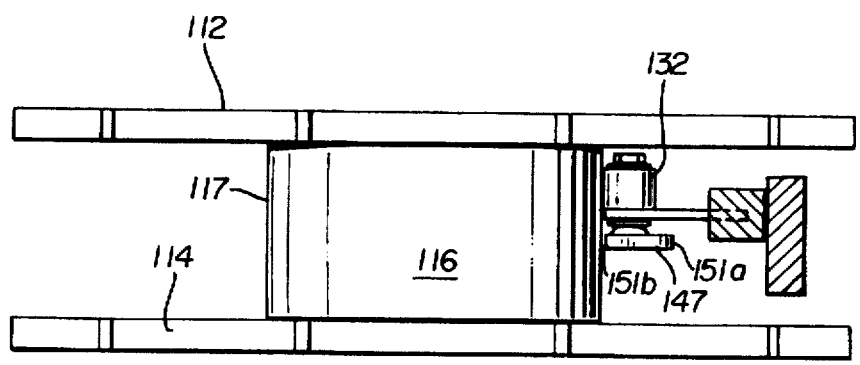
FIG. 7 is an end view of an alternate embodiment of the star wheel assembly and cam follower assembly.

Referring to FIG. 7, showing an alternate embodiment of the present invention, smaller diameter star wheels can use a hub 116 having a constant outer diameter 117 and cam followers 132 and 134 running directly against hub 116 rather than a cam attached to the hub. This configuration necessitates the use of stop blocks 145 and 147 having the lower portion 151 modified to only have one lobe 151a facing away from hub 116. Lobe 151b of stop blocks 145 and 147 has a reduced diameter which must be less than the outer diameter of cam followers 132 and 134 otherwise stop block 145 and 147 may interfere with the engagement of hub 116 against cam followers 132 and 134. Stop blocks 45 and 47 having large lobes 51b as shown in FIG. 6 may be used with hub 116 if a circumferential groove is machined in hub 116 to provide clearance for lobes 51b.

The descriptions above and the accompanying drawings should be interpreted in the illustrative and not the limited sense. While the invention has been disclosed in connection with the preferred embodiment or embodiments thereof, it should be understood that there may be other embodiments which fall within the scope of the invention as defined by the following claims. Where a claim is expressed as a means or step for performing a specified function it is intended that such claim be construed to cover the corresponding structure, material, or acts described in the specification and equivalents thereof, including both structural equivalents and equivalent structures.

What is claimed is:

1. A self locating star wheel system for use with articles processed by a machine:
   (a) a star wheel assembly having
      (i) at least one star wheel;
      (ii) a hub attached to said at least one star wheel;
      (iii) a cam attached to said hub said cam having an outer surface;
   (b) means for supporting said star wheel assembly; and
   (c) a cam follower which engages said outer surface of said cam, said cam follower being connected to the machine, wherein a geometric relationship exists among said at least one star wheel, said cam and said cam follower such that when said outer surface of said cam is engaged with said cam follower, said star wheel is properly located with respect to a stream of the articles.

2. The star wheel system of claim 1, wherein said at least one star wheel has a disk-like body, a center axis, an aperture transverse to said body, said aperture being centered on said center axis, an outer periphery, a plurality of pockets along said outer periphery, and a plurality of teeth on said outer periphery, each one of said teeth being formed between two adjacent pockets.

3. The star wheel system of claim 2, wherein said hub has a first end, a second end, a center axis aligned with said center axis of said star wheel, an axial aperture centered on said center axis, and an outer surface.

4. The star wheel system of claim 3, wherein said cam is disposed between said first end and said second end of said hub, said cam having a center axis aligned with said center axis of said hub, and said outer surface of said cam extending beyond said outer surface of said hub.

5. The star wheel system of claim 4, wherein said pockets have a concave shape, and wherein said pockets are equal size and uniformly spaced around said outer periphery of said star wheel.

6. The star wheel system of claim 4, wherein said outer surface of said cam is circular.

7. The star wheel system of claim 4, wherein said cam follower comprises:
   (a) a generally U-shaped bracket having a base and two arms extending in a plane from said base, said base having an aperture for receiving a pivot element, said arms each having an end with an outer edge, said bracket having a top face and a bottom face;
   (b) two rollers adapted to engage said outer surface of said cam, each roller having an outer surface and a center axis, each roller being mounted on the end of one of said arms such that said roller extends from said top face of said bracket and said center axis of said roller is normal to said plane of said arms, said outer surface of said roller extends beyond said outer edge of said end of said bracket, and said roller freely rotates; and
   (c) a pivot element attached to a stationary member of said machine, said pivot element being received in said aperture of said bracket such that said bracket pivots on said pivot element, said pivot element being located on said stationary member so that both of said rollers contact said outer surface of said cam when said cam is engaged with said rollers.

8. The star wheel system of claim 7, wherein said cam follower further comprises at least one stop member attached to said bracket such that said at least one stop member engages said stationary member of said machine before either of said rollers contacts said stationary member when said bracket pivots either of said rollers toward said stationary member.

9. The star wheel system of claim 8, wherein said at least one stop member has a generally cylindrical shape, is axially aligned with said roller, and extends from said bottom face of said bracket.

10. The star wheel system of claim 8, wherein said cam follower further comprises a spring acting between said bracket and said stationary member of said machine to pivotably bias said bracket in one direction such that when said rollers are not engaged with said cam, one of said at least one stop members engages said stationary member thereby stopping said bracket from pivoting further.

11. The star wheel system of claim 10, further comprising a sensor attached to said stationary member of said machine, said sensor cooperating with one of said at least one stop members such that when said stop member engages said stationary member, said sensor is activated to send a stop signal to the machine.

12. The star wheel system of claim 4, wherein there are two star wheels, said two star wheels being disposed in spaced parallel alignment such that said pockets and teeth of one star wheel align with the pockets and teeth the other star wheel, and said hub is located between said two star wheels.

13. The star wheel system of claim 4, wherein means for supporting said star wheel assembly comprises a washer plate, a shaft, a hand nut, and a mounting base, said washer plate being a disk having a center axis and an aperture centered on said center axis, said washer plate being attached to said first end of said hub and axially aligned with said hub, said aperture in said washer plate being smaller diameter than said axial aperture in said hub, said shaft being received in said axial aperture of said hub, said shaft having a first end extending beyond said washer plate and attached to said hand nut, said shaft having a second end having external threads, said shaft having a center section with mechanism which prevents said shaft from being moved axially entirely through said aperture of said washer plate, said shaft having at least a first portion of small enough diameter to be received in said aperture of said washer plate, said first portion extending from said first end of said shaft to said feature, said mounting base having a threaded aperture which cooperates with said threaded second end of said shaft, said mounting base.

14. The star wheel system of claim 13, wherein said mechanism on said shaft which prevents said shaft from being moved axially entirely through said aperture of said washer plate is a shoulder.

15. A self locating star wheel system for use with articles on a packaging machine comprising:
   (a) a star wheel assembly having (i) two star wheels, each star wheel having a disk-like body, a center axis, an aperture transverse to said body, said aperture being centered on said center axis, an outer periphery, a plurality of pockets along said outer periphery, a plurality of teeth on said outer periphery, each one of said teeth being formed between two adjacent pockets, said star wheels disposed in spaced parallel alignment with each other such that said pockets and teeth of one star wheel align with the pockets and teeth of another star wheel;

(ii) a hub located between and attached to both of said star wheels, said hub having a center axis aligned with said center axis of said star wheels, an axial aperture centered on said center axis, and an outer surface;

(iii) a cam attached to said hub, said cam having a center axis aligned with said center axis of said hub, and said cam having an outer surface extending beyond said outer surface of said hub;

(b) means for supporting said star wheel assembly; and (c) a cam follower which engages said outer surface of said cam, said cam follower being connected to a stationary member of said packaging machine, wherein a geometric relationship exists among said star wheels, said cam and said cam follower such that when said outer surface of said cam is engaged with said cam follower, said star wheels are properly located with respect to a stream of articles in said packaging machine.

16. The star wheel system of claim 15, wherein said pockets have a concave shape, and wherein said pockets are equal size and uniformly spaced around said outer periphery of said star wheel.

17. The star wheel system of claim 15, wherein said outer surface of said cam is circular.

18. The star wheel system of claim 15, wherein said cam follower comprises:

(a) a generally unshaped bracket having a base and two arms extending in a plane from said base, said base having an aperture for receiving a pivot element, said arms each having an end with an outer edge, said bracket having a top face and a bottom face;

(b) two rollers adapted to engage said outer surface of said cam, each roller having an outer surface, each roller being mounted on the end of one of said arms such that said roller extends from said top face of said bracket, said outer surface of said roller extends beyond said outer edge of said end of said bracket, and said roller freely rotates;

(c) a pivot element attached to said stationary member of said packaging machine, said pivot element being received in said aperture of said bracket such that said bracket pivots on said pivot element, said pivot element being located on said stationary member so that both of said rollers contact said outer surface of said cam when said cam is engaged with said rollers.

19. A self locating star wheel system for use on a packaging machine comprising:

(a) a star wheel assembly having (i) two star wheels, each star wheel having a disk-like body, a center axis, an aperture transverse to said body, said aperture being centered on said center axis, an outer periphery, a plurality of pockets along said outer periphery, a plurality of teeth on said outer periphery, each one of said teeth being formed between two adjacent pockets, said star wheels disposed in spaced parallel alignment with each other such that said pockets and teeth of one star wheel align with the pockets and teeth of another star wheel;

(ii) a hub located between and attached to both of said star wheels, said hub having a center axis aligned with said center axis of said star wheels, an axial aperture centered on said center axis, and an outer surface;

(iii) a cam follower which engages said outer surface of said hub, said cam follower being connected to a stationary member of said packaging machine, wherein a geometric relationship exists among said star wheels, said hub and said cam follower such that when said outer surface of said hub is engaged with said cam follower, said star wheels are properly located with respect to a stream of articles in said packaging machine; and (b) means for supporting said star wheel assembly.

20. The star wheel system of claim 19, wherein said pockets have a concave shape, and wherein said pockets are equal size and uniformly spaced around said outer periphery of said star wheel.

21. The star wheel system of claim 19, wherein said cam follower comprises:

(a) a generally u-shaped bracket having a base and two arms extending in a plane from said base, said base having an aperture for receiving a pivot element, said arms each having an end with an outer edge, said bracket having a top face and a bottom face;

(b) two rollers adapted to engage said outer surface of said cam, each roller having an outer surface, each roller being mounted on the end of one of said arms such that said roller extends from said top face of said bracket, said outer surface of said roller extends beyond said outer edge of said end of said bracket, and said roller freely rotates;

(c) a pivot element attached to said stationary member of said packaging machine, said pivot element being received in said aperture of said bracket such that said bracket pivots on said pivot element, said pivot element being located on said stationary member so that both of said rollers contact said outer surface of said hub when said hub is engaged with said rollers.

22. A self locating star wheel system for use on a packaging machine comprising:

(a) a star wheel assembly having (i) two star wheels, each star wheel having a disk-like body, a center axis, an aperture transverse to said body, said aperture being centered on said center axis, an outer periphery, a plurality of uniformly spaced equal-size pockets along said outer periphery, said pockets having a concave shape which is a sector of a circle, a plurality of teeth on said outer periphery, each one of said teeth being formed between two adjacent pockets, said star wheels disposed in spaced parallel alignment with each other such that said pockets and teeth of one star wheel align with the pockets and teeth the other star wheel;

(ii) a hub located between and attached to both of said star wheels, said hub having a center axis aligned with said center axis of said star wheels, an axial aperture centered on said center axis, and an outer surface;

(iii) a cam attached to said hub, said cam having a center axis aligned with said center axis of said hub, and said cam having a circular outer surface extending beyond said outer surface of said hub;

(b) means for supporting said star wheel assembly;

(c) a cam follower which engages said outer surface of said cam, said cam follower comprising
  (i) a generally unshaped bracket having a base and two arms extending in a plane from said base, said base having an aperture for receiving a pivot element, said arms each having an end with an outer edge, said bracket having a top face and a bottom face;
  (ii) two rollers adapted to engage said outer surface of said cam, each roller having an outer surface, each roller being mounted on the end of one of said arms such that said roller extends from said top face of said bracket, said outer surface of said roller extends beyond said outer edge of said end of said bracket, and said roller freely rotates;
  (iii) a pivot element attached to a stationary member of said packaging machine, said pivot element being received in said aperture of said bracket such that said bracket pivots on said pivot element, said pivot element being located on said stationary member so that both of said rollers contact said outer surface of said cam when said cam is engaged with said rollers;
  (iv) at least one generally cylindrically shaped stop member attached to said bracket and axially aligned with said roller extending from said bottom face of said bracket such that said at least one stop member engages said stationary member of said packaging machine before either of said rollers contacts said stationary member when said bracket pivots either of said rollers toward said stationary member;
  (v) a spring acting between said bracket and said stationary member of said packaging machine to pivotably bias said bracket in one direction such that when said rollers are not engaged with said cam, one of said at least one stop members engages said stationary member thereby stopping said bracket from pivoting further, wherein a geometric relationship exists among said star wheels, said cam and said cam follower such that when said outer surface of said cam is engaged with said cam follower, said star wheels are properly located with respect to a stream of articles in said packaging machine; and (d) a sensor attached to said stationary member of said packaging machine, said sensor cooperating with one of said at least one stop members such that when said stop member engages said stationary member, said sensor is activated to send a stop signal to the packaging machine.

23. A self locating star wheel system for a packaging machine comprising:

(a) a star wheel assembly having
  (i) at least one star wheel having a disk-like body, a center axis, an outer periphery, a plurality of pockets along said outer periphery;
  (ii) a hub attached to said at least one star wheel, said hub having a first end, a second end, a center axis aligned with said center axis of said star wheel, and an outer surface;
  (iii) a cam attached to said hub between said first end and said second end, said cam having a center axis aligned with said center axis of said hub, and said cam having an outer surface extending beyond said outer surface of said hub;

(b) a support member supporting said star wheel assembly, said star wheel assembly rotating on said support member about said center axis of said star wheel;

(c) means for rotating said star wheel assembly;

(d) a plurality of articles to be packaged, said articles moving in a stream along said outer periphery of said star wheel, each article being received by a pocket of said star wheel as said star wheel rotates;

(e) a cam follower which engages said outer surface of said cam, said cam follower being connected to a stationary member of said packaging machine, said cam follower having a portion which activates a sensor, wherein a geometric relationship exists among said at least one star wheel, said cam and said cam follower such that when said outer surface of said cam is engaged with said cam follower, said star wheel is properly located with respect to said articles on said packaging machine;

(f) a sensor capable of sending a signal to stop said packaging machine, said sensor being attached to a stationary member of said packaging machine near said cam follower so that said portion of said cam follower activates said sensor when said cam follower is disengaged from said cam to send a stop signal to said packaging machine; and (g) means for moving said support member to selectively cause said cam to engage or disengage said cam follower; said means for moving also biasing said cam against said cam follower, but allowing said cam to be disengaged from said cam follower by a displaced article improperly engaging said star wheel.

* * * * *